US008169319B2

(12) United States Patent
Kaplan et al.

(10) Patent No.: US 8,169,319 B2
(45) Date of Patent: May 1, 2012

(54) VIRTUAL GROUP MAINTENANCE AND SECURITY

(75) Inventors: Gideon Kaplan, Kiryat Ono (IL); Avraham Menkes, Ramat Hasharon (IL); Dan Raphaeli, Kfar Saba (IL)

(73) Assignee: Zebra Enterprise Solutions Corp., Oakland, CA (US)

( * ) Notice: Subject to any disclaimer, the term of this patent is extended or adjusted under 35 U.S.C. 154(b) by 518 days.

(21) Appl. No.: 12/092,583

(22) PCT Filed: Nov. 8, 2006

(86) PCT No.: PCT/IL2006/001288
§ 371 (c)(1),
(2), (4) Date: Oct. 12, 2008

(87) PCT Pub. No.: WO2007/054932
PCT Pub. Date: May 18, 2007

(65) Prior Publication Data
US 2009/0079580 A1    Mar. 26, 2009

Related U.S. Application Data

(60) Provisional application No. 60/734,780, filed on Nov. 9, 2005.

(51) Int. Cl.
*G08B 21/00* (2006.01)
(52) U.S. Cl. .......... 340/572.1; 340/572.4; 340/10.1; 340/10.3; 340/10.32; 340/10.5; 340/13.24; 340/13.25; 340/13.26; 340/539.21; 455/88
(58) Field of Classification Search .......... 340/572.1, 340/573.1, 10.2, 10.51, 539.22, 539.23, 539.26, 340/686.6, 323 R, 572.4, 10.1, 10.3, 10.31, 340/10.32, 10.5, 539.21; 455/404.1, 88; 235/383, 384, 375; 375/E1.002; 273/454, 273/460
See application file for complete search history.

(56) References Cited

U.S. PATENT DOCUMENTS 5,774,876 A * 6/1998 Woolley et al. ............ 705/28
(Continued)

FOREIGN PATENT DOCUMENTS
WO      03/098528      11/2003

OTHER PUBLICATIONS

Search Report and Written Opinion for Application No. PCT/IL06/01288 dated Jun. 4, 2008.

*Primary Examiner* — George Bugg
*Assistant Examiner* — Sisay Yacob
(74) *Attorney, Agent, or Firm* — Alston & Bird LLP

(57) ABSTRACT

A method of providing security and maintenance of a group of devices using a group of tags. Each of the tags is attached to a device and includes a radio frequency transceiver for intercommunicating using ultra-wide band signals. Using the intercommunication, distance between two of the tags is determined and an alarm is triggered when the distance is greater than a previously defined threshold distance. The distance is preferably determined by measuring a round trip delay time between the transmission of a transmitted signal to the other tag and reception of a response signal in response to the transmitted signal from the other tag. The distance is preferably determined by measuring a time delay between transmitting a unicast ultra-wide band message and receiving a unicast response message. The intercommunication preferably uses ultra-wide band signals which relay information regarding completeness of the group between the tags of the group. A configuration mechanism is typically used for configuring the group. Upon completing the configuration, the configuration mechanism, e.g. reader or monitor, may be removed and the tags maintain the group and provide security by the intercommunication between the tags. The tags are preferably synchronized to transmit and receive solely during a previously determined periodic sequence of time intervals.

16 Claims, 6 Drawing Sheets

A MESH SYSTEM, NOT FULLY CONNECTED, IMPLEMENTING "GROUP SECURITY"

U.S. PATENT DOCUMENTS

| | | |
|---|---|---|
| 5,804,810 A * | 9/1998 | Woolley et al. ............... 235/492 |
| 6,512,455 B2 | 1/2003 | Finn et al. |
| 6,762,678 B2 | 7/2004 | Arens |
| 2003/0063585 A1* | 4/2003 | Younis et al. ................. 370/331 |
| 2005/0148339 A1 | 7/2005 | Boman et al. |
| 2005/0151623 A1 | 7/2005 | von Hoffmann |
| 2005/0200487 A1 | 9/2005 | O'Donnell et al. |
| 2006/0071786 A1* | 4/2006 | Fano ........................ 340/539.22 |
| 2007/0109099 A1* | 5/2007 | Raphaeli et al. ............. 340/10.2 |

* cited by examiner

A CENTRALIZED SYSTEM

A MESH SYSTEM, NOT
FULLY CONNECTED, IMPLEMENTING
'GROUP SECURITY'

A MESH SYSTEM
IMPLEMENTING 'GROUP SECURITY'

PROCESS: FLOW-CHART

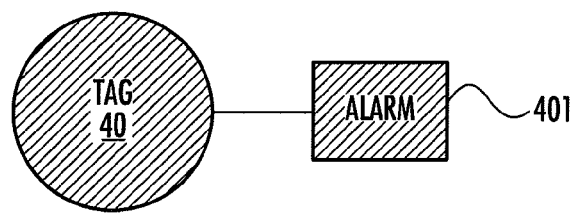
PHYSICAL ALARM
CONNECTION (TO TAG)
FIG. 4A
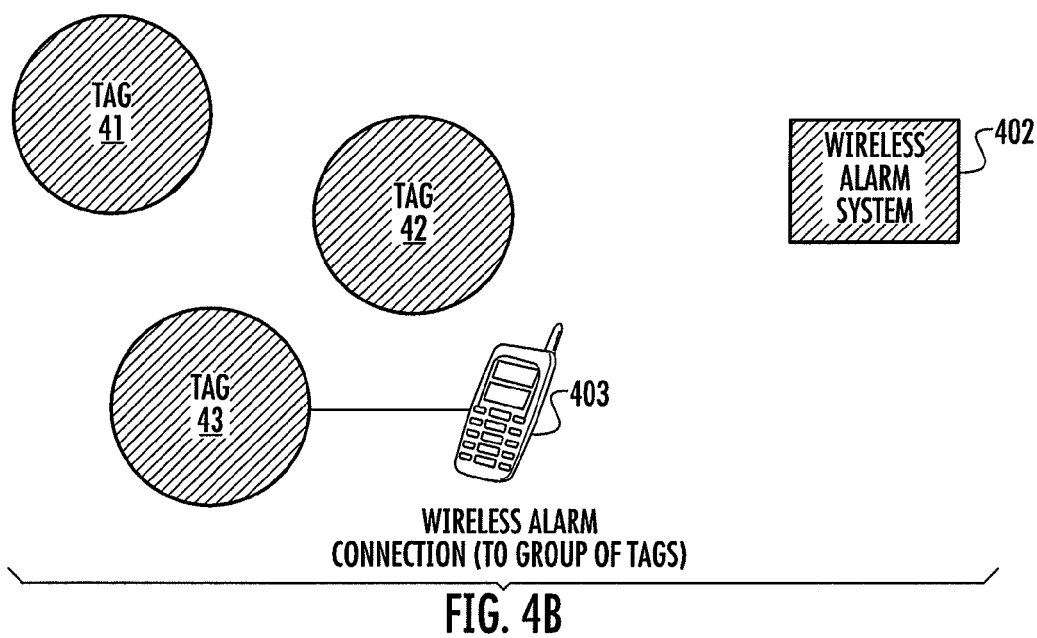
WIRELESS ALARM
CONNECTION (TO GROUP OF TAGS)
FIG. 4B
EXTERNAL ALARM CONNECTION ALTERNATIVES
FIG. 4

VIRTUAL GROUP MAINTENANCE AND SECURITY

FIELD OF THE INVENTION

The present invention relates to asset management using a radio frequency identification system and in particular the present invention includes active RFID tags which have a security function without the presence of an active reader in the vicinity of the RFID tags. The most preferred implementations use ultra-wide band active RFID tags.

BACKGROUND OF THE INVENTION

Reference is made to FIG. 1 a prior art system 101 for securing a group of elements or devices. Five RFID tags 10-14 are each attached to one of the devices. A monitor 100, a central controller of the system, monitors tags 10-14 by communicating with each of tags 10-14. The term "reader" is also used herein interchangeably to refer to a central controller or monitor 100. Prior art system 101 of FIG. 1 can be described as centralized. Monitor e.g. an RFID reader 100, monitors one or more RFID tags 10,11,12,13,14. Monitor 100 typically functions differently from tags 10-14. The main function of monitor 100 is to maintain group integrity. Any missing item, e.g. tag from the group is detected by monitor 100 and an action, e.g. an alarm, previously programmed into monitor 100 is activated. Other possible actions include reporting a security breach, or disabling a device for instance attached to one of tags 10-14. A system similar to system 10 is described in US patent application 20050148339, 'Personal item monitor using radio frequency identification' disclosed by R. Boman et al. A personal item monitoring system includes a monitor having a transmitter and a receiver located therein. A radio frequency identification (RFID) tag is adapted, coupled or pre-installed into a personal item. The monitor emits a radio frequency signal received by the radio frequency identification tag, and the radio frequency identification tag emits a responding signal if within a detection range. The monitor then alerts a user if the radio identification tag leaves the range of detection.

In US application publication 20050151623, 'PDA security system' disclosed by G. Von Hoffman, a system is described which secures a device such as a personal digital assistant (PDA) or a mobile phone, by requiring an 'authentication process' between the device and another specific element. If an alarm state occurs, when the specific element does not answer, or the specific element is not within the given range from the calling device, some selected functions of the calling device will be disabled.

In may applications the cost of a relatively expensive monitor (e.g. RFID reader 100), is typically more than hundred times the cost of an RFID tag. If a group of tagged devices includes about ten elements, the inclusion of monitor 100 increases the cost of implementation by tenfold. If monitor 100 is absent from centralized system 10, or malfunctioning, the modified system 10 cannot maintain any level of security. Furthermore, in prior art system 101 none of the tags 10-14 know about the existence of the any other tags 10-14 in the group, so information such as a list of members of the group cannot be obtained from any tag 10-14. A further limitation of prior art system 101 and other systems, is the inaccuracy of the range threshold in which the alarm is triggered. In the absence of an accurate distance measurement, system 10 may either trigger an alarm when the tagged devices are still close to each other, or too late, when one of tags 10-14 has been removed without prior authorization and the security breach is not prevented. In fact, prior art systems typically do not perform any distance determination measurement but rather than rely on attenuation of the RP signals which results in range varying by an order of magnitude because of differences in RF attenuation, reflections and multipath interference throughout the RF propagation pats between monitor 100 and tags 10-14. The lack of accurate range determination creates an increased potential for security breaches in prior art systems 10.

Another potential security breach known as "remote pickpocketing" is described in the article, Z. Kfir and A. Wool, Picking Virtual Pockets Using Relay Attacks on Contactless Smartcard Systems, (Cryptology ePrint Archive, Report 2005). A contactless smart card is a smart card that can communicate with other devices without any physical connection, typically using Radio-Frequency Identifier (RFID) technology. Contactless smart cards are becoming increasingly popular, with applications like credit-cards, national-ID, passports, physical access. The security of such applications is clearly critical. A key feature of RFID-based systems is their very short range: typical systems are designed to operate at a range of ~10 cm-~50 cm. Contactless smart card technology is vulnerable to relay attacks: An attacker can trick the reader into communicating with a victim smart card that is very far away. A 'low-tech' attacker can build a pickpocket system that can remotely use a victim contactless smart card, without the victim's knowledge. The attack system consists of two devices, a "ghost" and a "leech". The ghost can be up to 50 m away from the card reader, two orders of magnitude higher than the nominal range. The leech can be up to 50 cm away from the victim card. The main characteristics of the attack are: orthogonality to any security protocol, unlimited distance between the attacker and the victim, and low cost of the attack system. The attack using a ghost and leech on a contactless smart card can be made very difficult if an accurate distance determination measurement is performed to the contactless smart card.

There is thus a need for, and it would be highly advantageous to have a system and viral group maintenance and security which overcomes the disadvantages of prior art centralized RFID systems, and particularly a non-centralized system in which additionally accurate range determination is provided.

The term "ultra-wide band" (UWB) as used herein is defined (by FCC and ITU-R) in terms of a transmission from an antenna for which the emitted signal bandwidth exceeds the lesser of 500 MHz or 20% center frequency. One type of Ultra-wide band (UWB) communication technology employs discrete pulses of electromagnetic energy that are emitted at for example, nanoseconds to microsecond intervals. For this reason, this type of ultra-wide band is often called "impulse radio." A UWB pulse is a single electromagnetic burst of energy. A UWB pulse can be either a single positive burst of electromagnetic energy, or a single negative burst of electromagnetic energy, or a series of pulses. Ref: http://en.wikipedia.org/wiki/Ultra_wide band.

Reference is now made to FIG. 2 (prior art) which illustrates the use of ultra-wide band signals (UWB) in an RFID system 101 of the prior art (described in PCT/IL2003/00358, publication No. WO/2003/098528), entitled "Method and system for distance determination of RF tags" incorporated herein by reference for all purposes as if fully set forth herein. As described in WO/2003/098528, reader 100 transmits a short pulse sequence representing symbol 205. The ultra-wide band signal is organized into three intervals including three parts: a preamble, data and a response period. In each of the parts, symbols 205 are transmitted by means of pulse transmissions, where the time between symbols is denoted $T_1$ typically on the order of 20 microseconds. The pulse sequence transmission duration $T_2$ for each symbol is substantially shorter than $T_1$, typically ~100 nanoseconds. Such short sequence of pulses are beneficial for reducing the peak to average ratio of the transmitter, both for easier implementation and for complying with regulatory peak power limits where applicable. As an example in a pulse train, each pulse sequence 205 is composed of N e.g. 11 arrow pulses, each with a polarity determined by a binary sequence which is chosen for autocorrelation and synchronization properties with a flat spectrum. Tags 03a and 03b respond respectively with pulse sequences 207a and 207b also with time interval $T_2$ of about 100 nanoseconds and time interval $T_1$ between pulse sequences 207 (on the order of 20 microseconds, as mentioned above). The use of very short pulse sequences 205 and 207 with a long time interval between pulse sequences 205 and 207 allows a relatively large number of parallel-links between reader 100 and multiple tags 03a and 03b. According to one of the embodiments disclosed in WO/2003/098528, reader 100 receives one or more ultra-wide band response signals, respectively from one or more tags typically including overlapping wide band response signals from different tags. Reader 100 detects the response sequence and decides whether one or more tags answered the ultra-wide band interrogation signal transmitted by reader 100. Reader 100 determines the round trip delay between transmitting the interrogation signal and receiving the response signals and from the round trip delay an accurate distance measurement to tags 03a and 03b is obtained.

The terms "device", "item" and "object" are used here interchangeably when referring to devices, items and objects attached to tags.

The term "determination of a distance" refers a method to determine distance absolutely or a relatively measurement of distance, not estimating of distance based on radio frequency attenuation which is dependent on radio frequency, propagation characteristics.

SUMMARY OF THE INVENTION

According to the present invention there is provided a method for providing security and maintenance using a group of tags. Each of the tags includes a radio frequency transceiver for intercommunicating between the tags, preferably using ultra-wide band signals. Using the intercommunication, distance between two of the tags is determined and an alarm is triggered when the distance is greater than a previously defined threshold distance. The distance is preferably determined by measuring a round trip delay time between the transmission of a transmitted signal to the other tag and reception of a response signal in response to the transmitted signal from the other tag. The distance is preferably determined by measuring a time delay between transmitting an ultra-wide band message and receiving a ultra-wide band response message. Intercommunication between the tags preferably relays information regarding completeness of the group, between the tags of the group. The intercommunication preferably uses ultra-wide band signals which relay information regarding completeness of the group between the tags of the group. A configuration mechanism, for instance integrated into a removable reader, is typically used for configuring the group. The configuration of the group typically includes: adding a tag to the group, removing a tag from the group, programming which tags intercommunicate with each other and storing in the tags a parameter proportional to the previously defined threshold distance. Upon completing the configuration, the configuration mechanism, e.g. reader or monitor, may be removed and the tags maintain the group and provide security by intercommunication between the tags. The tags are preferably synchronized to transmit and receive solely during a previously determined periodic time interval, for efficient protocol and power saving. One or more parameters that define the intercommunication protocol, e.g. duration, period, timeout is preferably stored in memory of each of the tags during the configuration. The synchronization between the tags insures that an addressed tag is receiving when another tag is transmitting and is preferably performed by transmitting beacon signals from one or more tags to other tags. In some embodiments the synchronization packets and the maintenance packets are the same. The tags preferably switch into a sleep mode outside of the time interval and switch to an active mode during the time interval, in order to conserve battery power. The intercommunication between the tags of the group preferably includes either multicast or broadcast ultra-wide band transmitted messages, and a decision by any one tag of the group to transmit with a time frame is probabilistic typically based on an estimate of traffic within the group or the decision is deterministic according to a previously defined ordering algorithm. Alternatively, intercommunication between the tags of the group includes transmitting unicast ultra-wide band transmitted messages and receiving unicast response messages to relay information regarding completeness of the group between the tags of the group. The intercommunication is performed during a time interval, which is sufficiently long so that the first tag of the group to interrogate receives an interrogation signal from the last of the group to interrogate, and outside the time interval all the tags switch into a sleep mode, thereby conserving battery power. The alarm is preferably either a sound, a light, an alarm record stored in one or more tags, a transmitted alarm message, and/or a command disabling a device, e.g. mobile telephone attached to one of the tags. When the alarm is logged in memory as an alarm record stored in one or more of the tags, the alarm record is retrieved upon querying by a reader in temporary communication with the one or more of the tags, or is conveyed as soon as any of the tags with the record are detecting a nearby relevant reader According to the present invention there is provided a system including a group of tags. Each of the tags includes a radio frequency transceiver for intercommunicating between the tags using ultra-wide band signals and the tags determine a distance to another tag by using the intercommunication. An alarm mechanism triggers an alarm when the distance is greater than a previously defined threshold distance. The distance is determined by measuring a round trip delay time between the transmission of a transmitted signal to the other tag and the reception of a response signal in response to the transmitted signal from the other tag. A configuration mechanism is preferably used to add a tag to the group, remove a tag from the group, to program one or more tags to intercommunicate with said another tag and to store a parameter proportional to the previously defined threshold distance.

The intercommunication between the tags of the group includes using unicast ultra-wide band transmitted messages and receiving unicast response messages to relay information regarding completeness of the group between the tags of the group, The intercommunication is preferably performed during a time interval, the time interval is sufficiently long so that the first tag of the group to interrogate receives an interrogation signal from the last of the group to interrogate and outside the time interval all the tags switch into a sleep mode, thereby conserving battery power.

BRIEF DESCRIPTION OF THE DRAWINGS

The invention is herein described, by way of example only, with reference to the accompanying drawings, wherein:

FIG. 4a and FIG. 4b schematically illustrate different mechanisms for generating an alarm, according to embodiments of the present invention.

Figure 1:
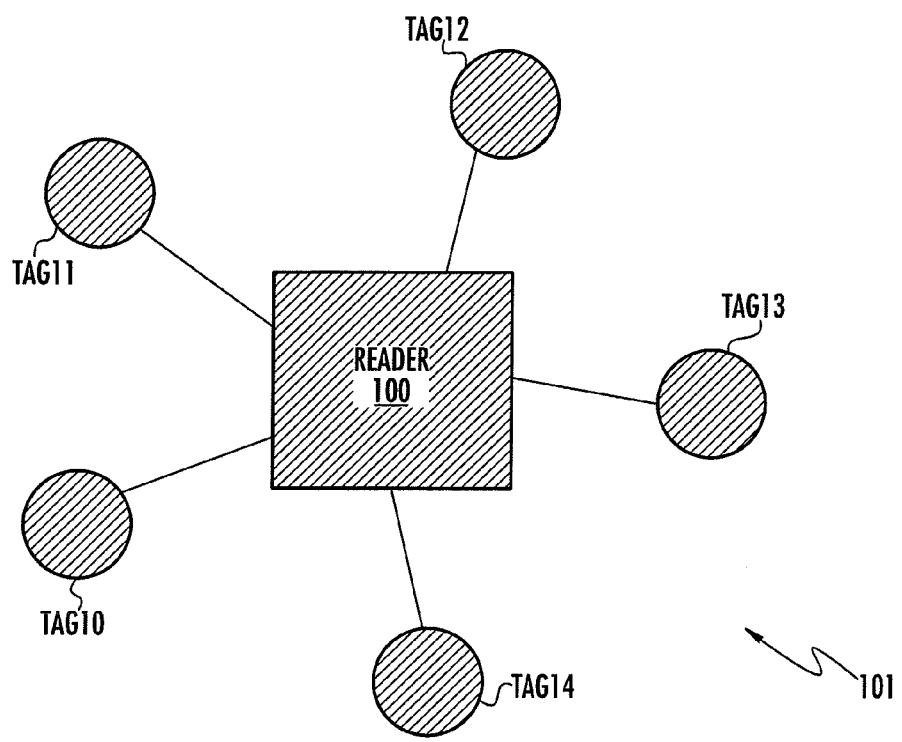
FIG. 1 is a simplified schematic drawing of a conventional radio frequency identification (RFID) system of the prior art.

In the Figures, tags labeled with two digit references, greater than or equal to 20 are equivalent and refer to tags according to embodiments of the present invention.

DESCRIPTION OF THE PREFERRED EMBODIMENTS

The present invention is of a system and method for providing security and maintenance using a group of tagged devices. Specifically, the system and method includes communication and distance measurement between tags of a radio frequency identification system. The tags are configured to be included in a vial group by a configuration mechanism such as an RFID reader. After configuration the RFID reader is optionally removed. The signals between the tags preferably include pulse sequences, and the pulse sequences include a short train of pulses, such as in ultra-wide band signaling. The signals are either broadcast to all tags of the group within range or the signals are addressed as unicast or multicast signals to one or more of the tags.

The principles and operation of a system and method of providing security and maintenance using a group of RFID tags, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, principal intentions of the present invention are to: provide robust, flexible and programmable group security, that does not rely on the existence of an RFID reader but is based on relatively low-cost active RFID tags. A group configuration is performed by an RFID reader including: adding an RFID tag to the group and releasing the RFID tag from the group. Subsequent to configuration, the reader may be removed for instance to configure another group. The tags preferably use ultra-wide band signal for precise monitoring of distances between the members of the group. When one of the tags of the group is moved an alarm is triggered. The tag switch by between an active mode and a sleep mode to conserve battery power, complicating the task of tag to tag intercommunication.

There are many applications where a group of tags need to be with a specific range of distance from each other and a violation of this range is a reason for an alarm, notification or disabling a device attached or wirelessly connected to one or more of the tags. Examples of devices that can be disabled include portable computers, cellular phones or any other device whose level of activity can be changed by a command directly or indirectly from an RFID tag. The distance between group members, in typical applications, can be several centimeters in one application, or several tens of meters in another application typically up to about hundred meters using conventional ultra-wide band signaling.

The present invention is applicable to (but not limited by): a kit of devices/objects assembled in a factory to be sent elsewhere, and all the items of the kit must be transported together, for example a kit of elements for manufacturing an airplane part. If even one element is missing from the kit, the airplane part cannot be assembled. It is highly desirable to make sure that all items of the kit are present and accounted for, possibly within a given distance from one to the other. Even if one element of the kit is missing a security breach or operational error may be in progress.

A group of soldiers going out to a mission. It is imperative that the soldiers of the group are not separated by too large distance from the group. If one of the soldiers is lost or injured it is important that the members of the group are alarmed. It is further useful in such application to notify the distance of the missing soldier of the group one from each other and in this way the missing soldier is more easily located.

An array of wireless sensors, that together perform a monitoring function, and if is required to constantly verify that none of the wireless sensors is moved, stolen, disabled or modified, or otherwise tampered with; and A set of computers and peripherals, lab equipment including a computing or test set-up where one wants to verify constantly that none of the devices is moved or stolen.

A payment device such as wireless smart card and additional verification one or more tags that are used to authenticate the smart card. If the smart card is at a long distance from such authenticating devices, it cannot function; in this way, if the smart card is stolen, the thief cannot use it.

Figure 2:
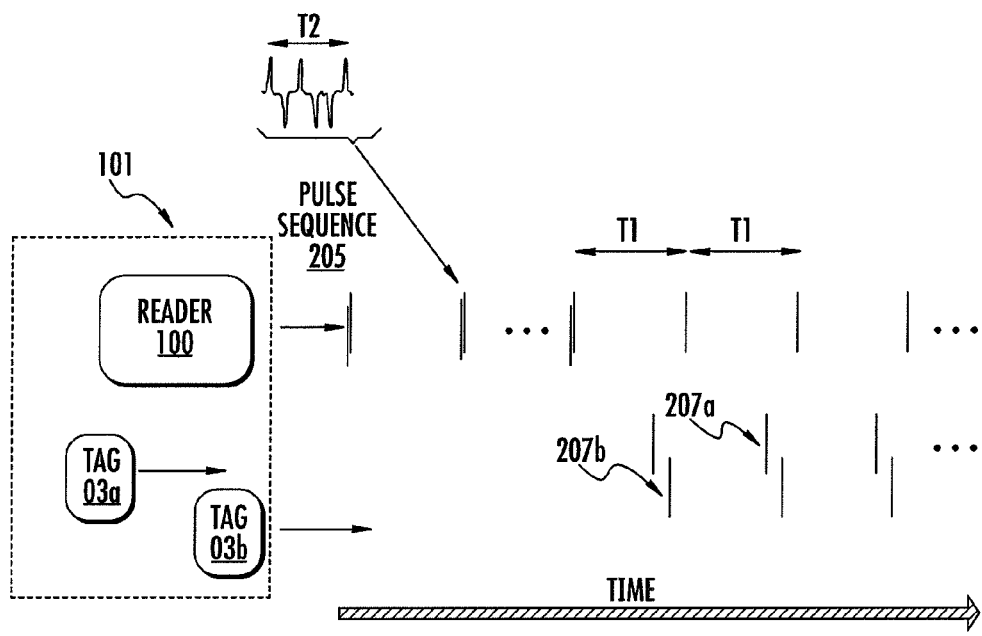
FIG. 2 is a prior art drawing which illustrates ultra wide band signaling in a conventional RFID system.
Figure 2A:
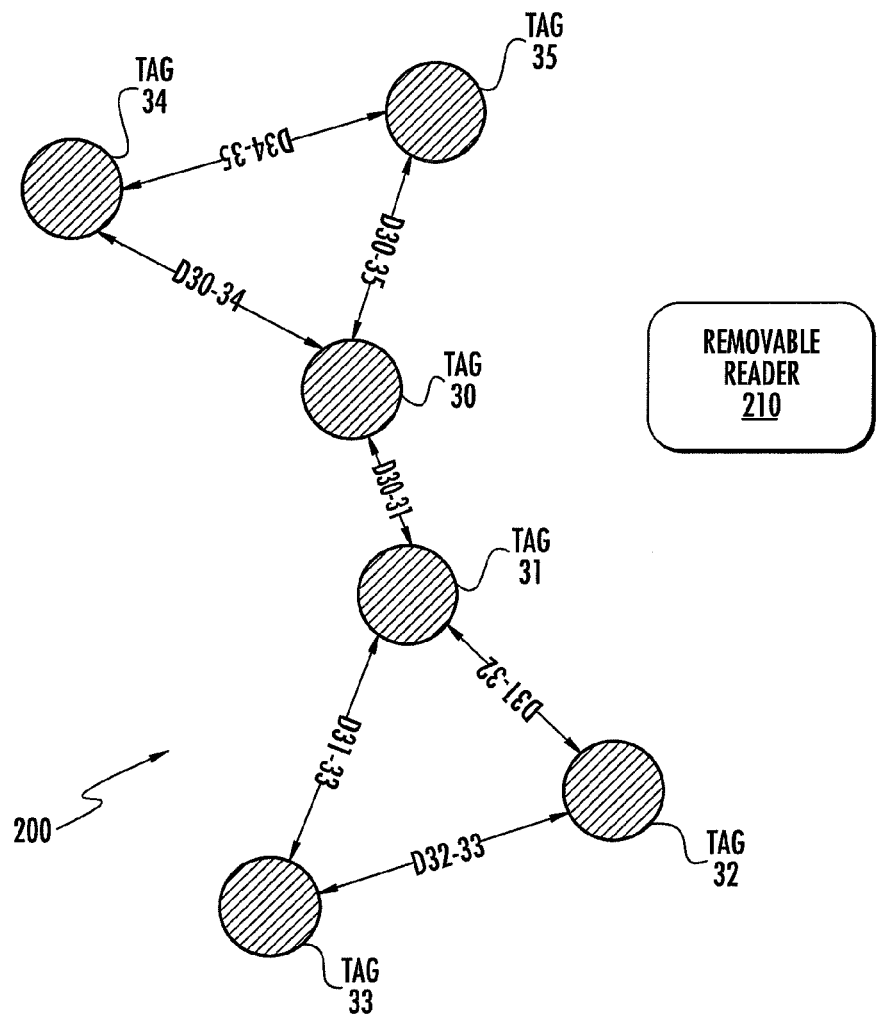
FIG. 2a is a simplified schematic drawing of a group of RFID tags, according to a embodiment of the present invention.
Figure 2B:
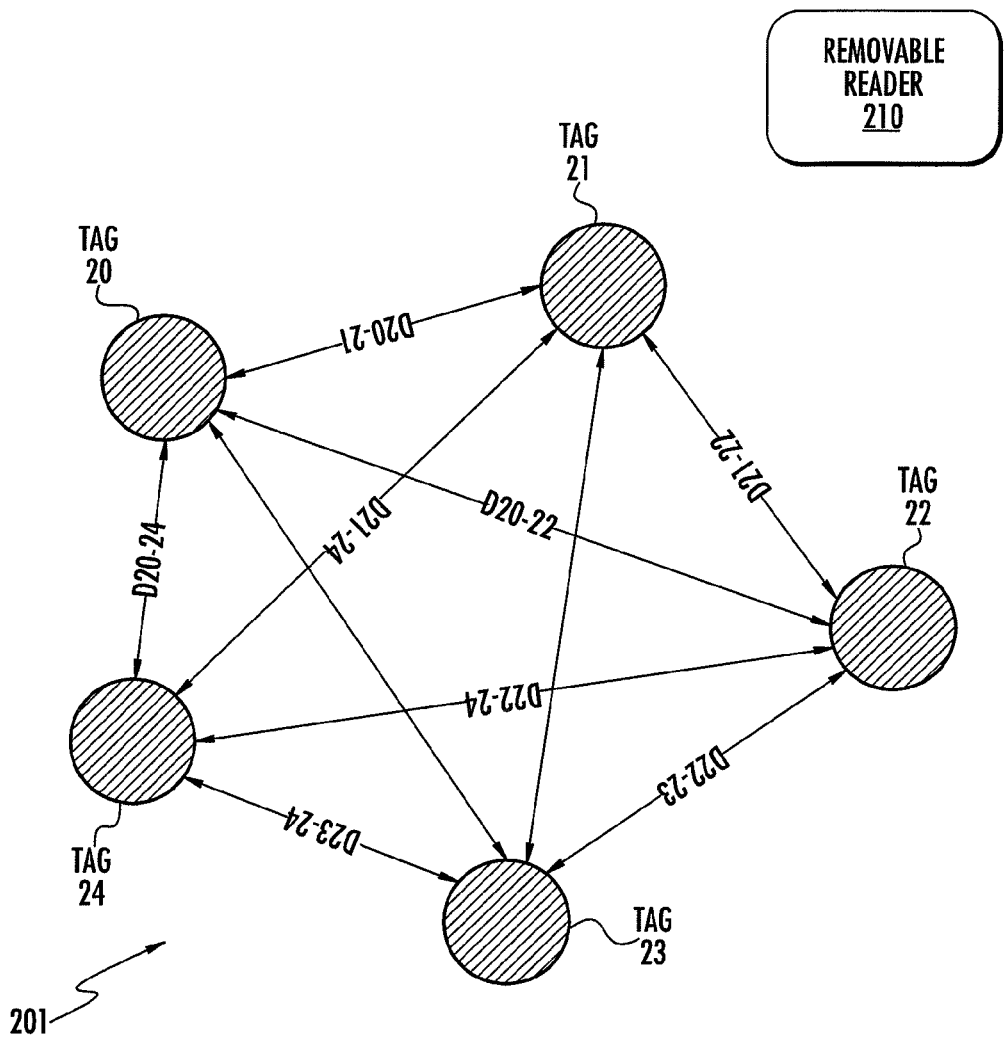
FIG. 2b is a simplified schematic drawing of a group of RFID tags, according to another embodiment of the present invention.

Referring now to the drawings, FIG. 2a illustrates an embodiment of the present invention. Six RFID tags numbered 30-35 are communicating in a mesh network 200. One or more of RFID tags 30-35 are respectively attached to or integrated with devices (not shown). Two RFID tags 30 and 31 are typically communicating with each others RFID tag 30 communicates with tags 34 and 35 while tag 31 communicates with tags 32 and 33. Typically, tags 34 and 35 are in communication with each other and tags 32 and 33 are in communication with each other. However, tags 34 and 35 are not in communication with tags 32 and 33, for instance became the distance is too large. Typically, when any one tag is in communication range with another tag, the one tag occasionally interrogates the other tag. As soon as the one tag is moved beyond the previously determined allowed distance range between the tags, one or both of the RFID tags in intercommunication sends a message to a central controller if present and/or triggers an alarm e.g. a light or sound alarm. Another embodiment 201 of the present invention is illustrated in FIG. 2b. In embodiment 201, each of five tags 20-24, optionally attached to respective devices (not shown) are in communication with each other. Embodiment 201 is fully connected or redundant.

Figure 3:
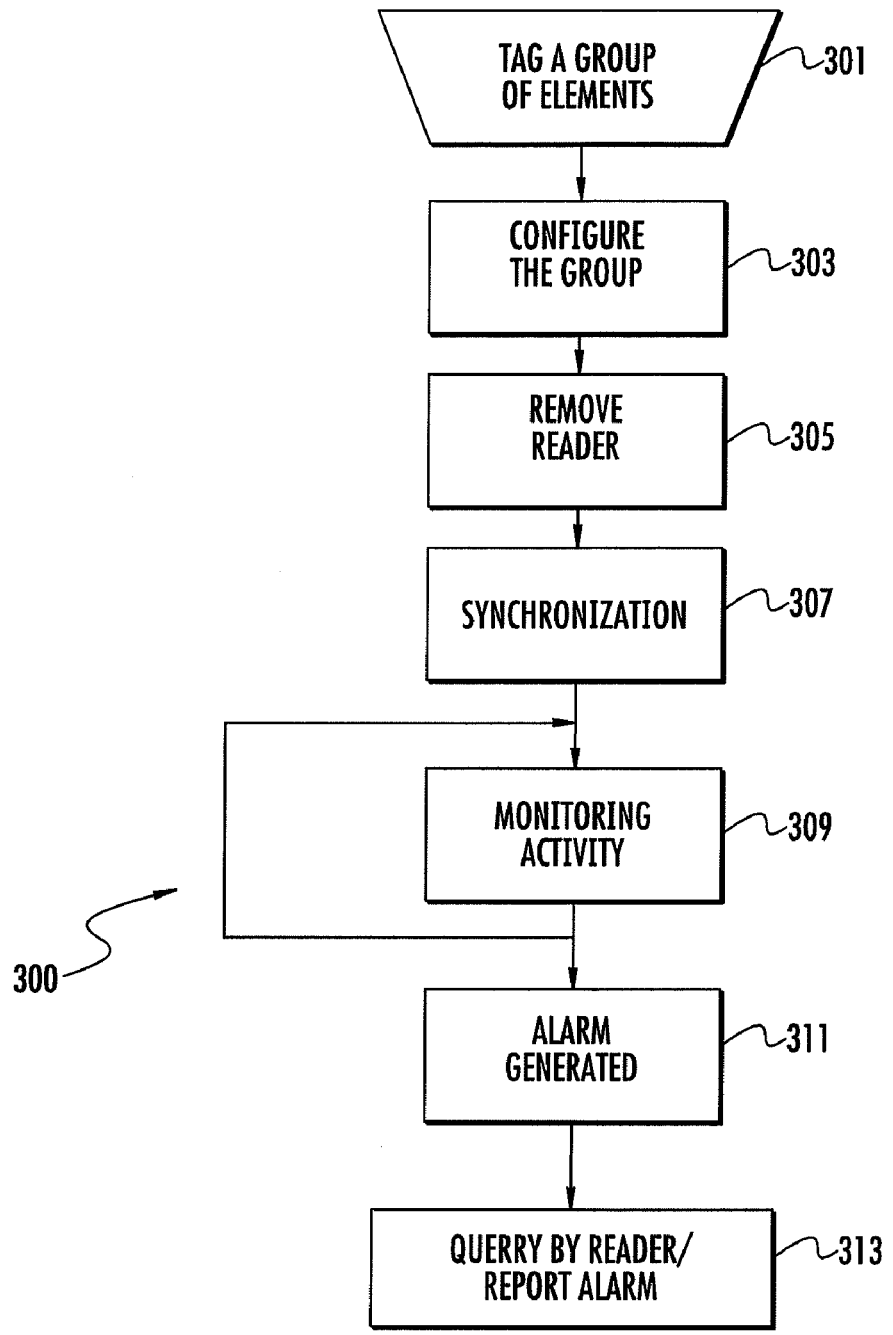
FIG. 3 is a simplified flow drawing of a process, according to another embodiment of the present invention.

Reference is now made to FIG. 3, a drawing of a process 300 according to an embodiment of the present invention. According to an embodiment of the present invention, tags are attached (step 301) to a group of elements (or devices) for securing the elements, a monitor or reader 210 is used for configuring (step 303) the group of tags and after initial configuration, reader 210 is optionally removed (step 305) from the group and the group maintains security independent of reader 210. The group is configured (step 303) by a command typically sent by a ultra-wide band RFID reader, to the RFID tags. The communications between the tags are preferably synchronized (step 307) prior to monitoring (step 309). Monitoring (step 309) preferably includes accurate determination of distances between the tags. If one of the determined distances is not within a previously determined range an alarm is generated (step 311).

The alarm condition or log of alarms is optionally queried (step 313) by reader 210.

According to an embodiment of the present invention during configuration (step 303) of the groups each time one tag is interrogated by reader 210, the list of group members known to the interrogated tag is uploaded from that tag to reader 210. Then reader 210 can check the presence of all the other tagged items in the group by interrogating them. The reader 210 does not necessarily possess a priori the complete list of group members. In some embodiments of the present invention reader 210 may receive the complete list of group members by performing a broadcast "collect all" interrogation command to all tags optionally those which are matching some selection criteria within a configuration range.

According to embodiments of the present invention, after configuration (step 303), the reader 210 is typically not available, not necessary and typically removed (step 305) from group 200, 201. A real time alarm occurs when one or more of the tagged devices is taken from group 200, 201 even in the absence of reader 210.

Systems 200 and 201 in preferred embodiments employ ultra-wide band RFID technology. Each device belonging to group of objects being secured is tagged (step 301) with an ultra-wide band RFID active tag. Furthermore each tag is able to communicate with other tags using ultra-wide band communication, as well as perform a ranging measurement using round trip delay time measurement similar to the methods disclosed in PCT International Patent Application Publication No. WO 2003/098528. A tag searches in the time domain to find an ultra-wide band signal of a known pattern, and when it does, the tag synchronizes (step 307) e.g. its wake up period, with other tags of group 200, 201. During configuration (step 303), one of the tags is selected as the first interrogator in the cycle; once it has completed its interrogation of the other members, it will pass the role of interrogator to another tag.

The group of tags can be symmetrical, that is each tag interrogates equally all the other tags, or the group is asymmetrical when one tag is responsible for interrogating the other tags, accordingly as determined during configuration (step 303). However if the configuring tag is removed or not functioning, then another tag in the group is configured to be the current 'interrogator'. Thus it is feasible to obtain group security without necessitating the constant presence of a reader 210.

An implementation of embodiments of the present invention based on ultra-wide band signaling of active RFID tags, preferably includes the following main characteristics: Each tag can receive and transmit ultra-wide band signals. A tag can communicate with another tag and preferably all other tags in the group. In an efficient protocol each transmitting tag sends a broadcast message, to which all other tags respond, and the originating tag gets immediate information regarding all other tags in the group. This however requires a sophisticated tag receiver processing. In another protocol, each tag transmits a unicast message and receives a response from only one other tag, which in turn is responsible for communicating with the next tag, and so on. For instance in embodiment 201, tag 24 is queried by tag 23, tag 23 is queried by tag 22, tag 22 is queried by tag 21, tag 21 is queried by tag 20 and tag 20 is queried by tag 24. In another protocol, each tag (in his turn) queries each of the other tags.

Such a query cycle may occur once every time interval of ~1-~10 minutes, as an example. A list of tags in the group is preferably provided to each tag of the group dug configuration (step 303) of the group, or at least each tag knows another tag with which to communicate. Bach tag of the group preferably receives the list including all members of the group in case one of the tags is not present or non-functional. Each tag preferably waits (for instance before entering sleep mode) until an interrogating packet is received since the list of tags is preferably cyclic. In this way, each tag is informed about the completeness of the group. Each tag in order to conserve power is preferably active only part of the time in order to reduce power consumption. According to one embodiment of the present invention, time is typically divided into frames, the length of a frame is for example half a second. Each one second frame is divided into active part of short duration (e.g. 10 millisecond) and inactive or sleeping part of (490 millisecond). Every tag that enters the active state is either a transmitting tag or a responding tag during the active part of the frame.

According to preferred embodiments of the present invention, an interactive and iterative time synchronization (step 307) algorithm for the group of tags is preferably employed. Synchronization (step 307) allows for the tags of the group to intercommunicate with each other during a previously determined time interval. When the tags alternate between 'sleep' and 'active' modes, as is often the case with active RFID tags equipped with a low cost battery, synchronization (step 307) algorithm can shift active times in such a manner that the active times of all tags of the group coincide. Consequently, querying of all the tags doesn't require waiting for some of the tags to "wake up". Such a synchronization (step 307) algorithm can be based on the following principles: each tag, when configured, first starts its operation by turning on for e.g. 10 seconds, during which the tag searches to synchronize based on 'beacon' signals; subsequently, the tag wakes up periodically according the period of the beacon signals since the periodicity is configured in advance. To generate the beacon signals, either one of the tags in the group is designated as the transmitter of repetitive short messages, or all the tags in the group share the task of transmitting the repetitive short messages typically in a 'round-robin' manner.

Each packet that is transmitted at the beginning of a frame is preferably used to synchronize (step 307) the listeners, i.e. all the other tags that did not transmit during the frame. In case the listening tag receives transmissions from two or more other tags, the listening tag synchronizes (step 307) to the earliest (or alternatively the latest) among the received transmissions us improving stability and avoiding problems associated with timing loops.

Another possibility for overall synchronization (step 307) can be based on the tags getting a 'time signal' from reader 210, during configuration (step 303). Receiving a time signal simplifies the conditions for maintaining time synchronization afterwards.

Each tag decides if it will be a transmitter for the next frame, and the decision is random, i.e. each tag device randomly decides if it is a transmitter or not according to a certain probability. The probability preferably is inversely proportional to the number of tags in the group. The simplest algorithm to limit congestion of the requests is based on the number of known neighbors. The probability of transmission is inversely proportional to the number of neighbors. Improved congestion control can be performed by analyzing traffic information within the group.

A responding tag may simultaneously detect two or more received signals, namely ultra-wide band packets from other tags. It is not necessary that the responding tag responds both received signal packets. The responding tag will arbitrarily choose one signal to respond to and wait for the other transmitted packet to be retransmitted. Consequently tags are preferably not programmed to generate (step 311) an alarm at the moment that an expected transmission is not detected. The following (exemplary) protocol tests if a tag is absent from the group: Each transmitting tag transmits the list of tag identifiers and the latest time for which a transmission is detected from each tag. Each receiving tag adds to the list of tags based on any received transmissions. The list each tag is transmitting is composed of the list it heard from the previous tags, which is a collection of all data known to that other tag, and its own received tags. In this way, information of the existence and range of tags spreads quickly and efficiently throughout group 200, 201, thus after a few frames, if a tag of the group currently not listed by any other tag, then an alarm condition is created. Further checks can be done using direct unicast to the non-responding tag using the tag that last communicated successfully with the unresponsive tag to verify lack of response.

Due to practical limitations, the number of packets that can be processed concurrently is limited by the memory and processor resources in the tags of the group. Typically, unicast and/or multicast interrogation transmissions (and not broadcast transmissions) are used to limit the processing required to simultaneously process multiple responses from other tags.

The tags preferably not only listen to requests, but to all traffic that can be detected, including other tags responses to requests. As a result, the group rapidly acquires information and may relay the information as required.

Usually a transmitted packet requires a response from all addressed tags. By using prior knowledge, the transmitting tag has the responsibility to limit the number of responses to an optimal number by using a random group division. The random group division method ensures that the group never exceeds the maximum traffic allowed by the protocol, and improves reliable reception of the responses.

Reference is now also made to FIG. 4, which illustrates an alarm system attached to one or more of the tags. The connection to the alarm system may be wired as in alarm 401 or wireless to wireless alarm system 402. In a preprogrammed schedule, each tag of the group interrogates the other tags of the group using either unicast, multicast or broadcast command, and tests each for presence and for being in a preprogrammed authorized range. In embodiment 200, (FIG. 2*a*) each tag measures the round-trip delay to four other tags preferably using ultra-wide band signaling according to the teachings of WO2003/098528. If maximum range is violated, an alarm state is reached. The alarm is communicated to the external world using sound, light, or if there is reader 210 in the area, using an alarm message or interrupt. Alternatively, if there is no reader 210 an alarm is generated using an alarm system 401, 402. In an alternative embodiment, a device e.g. cellular telephone connected to one of the tags may generate an alarm.

According to another embodiment, there is also an option to store (step 311) the alarm condition in a log file in the tag, and when queried (step 313), the tag reports the alarm condition.

According to another embodiment of the present invention, a device, e.g. cellular telephone is locked when the tag attached to the device is placed or found in an alarm condition. An unauthorized user is prevented from using the locked device, since even if the tag of the locked device is disabled, the locked device is typically only used with other tagged devices of the same group. Moreover, the other tagged devices of the same group as the locked tagged device will typically also receive notification of the alarm and will not establish normal communications with the locked device of the group. Furthermore, if the locked tagged device is not present, or present at an incorrect range, or removed from the group, the locked device remains locked and cannot be used. It is understood that cryptographic algorithms can be added to strengthen the locking mechanism against possible tampering attempts to unlock the locked device.

Group Configuration:

In a kit preparation process, a user is using a software application that presents to the user a list of all relevant tagged items (e.g. in the warehouse). Using the application, the user selects items and places the items into a group by clicking on an item presented on the display, and adds the clicked item to the list of items in the kit. Afterwards the software application configures (step 303) the group of tagged items, by wireless commands preferably sent by reader 210. The group may also be programmed to check for the authorized users of the group according to a certain schedule. Once the group is brought together, a command is issued to activate monitoring activity (step 309). Similarly, in a security application, a user uses a software application that presents all tagged items in the facility, and the user selects items as members of a group and then activates the group.

In another configuration, the group of tagged items or part of the group is brought first to be in the vicinity of reader 210, or reader 210 is brought to the vicinity of the tagged items. Reader 210 presents to the user the list of items in range, and the user selects the desired group members. If only a part of the group was configured, reader 210 or a different reader 210 is moved to the vicinity of the other group members. At the end of item selection, or at any other time, reader 210 is commanded to activate the group.

In still another example of configuration (step 303), reader 210, e.g. handheld is brought to the vicinity of a tagged item to be placed in the group. The user types in an identifier of the item and reader 210 commands the item to be part of the group. Alternatively an identifier was preprogrammed, into handheld reader 210. The group may be configured by bringing the tagged items together within a previously defined range and the group is configured automatically activated by a button or by a command to include all tagged devices within the range. The tagged items of the group are further programmed during configuration (step 303) regarding other parameters, such as what constitutes an alarm situation and what to do in case an alarm situation occurs.

Group Release:

Reader 210 can program a tagged item to detach from the group. Such a command should be transmitted to all tagged devices to check for the presence of the tagged item. Such a command typically requires a security mechanism, such as encryption and/or cryptographic authentication using any well known protocol in order to allow a tagged device to securely detach from the group.

Other Causes for Alarm Event:

System 201, 202 can be enhanced with additional security measures such as a tamper detection apparatus integrated with the tags and/or tagged devices. In case the tamper detection sensor detects a disabling attempt or detaching attempt of the tag from the item, the tag issues an alarm condition such as by transmitting (step 311) the alarm using a wireless link to all the other tags in the group.

Partial Group Maintenance:

Even after a first alarm condition, when one or more of the group elements is missing/malfunctioning or tampered with, the rest of the group can be still maintained active to transmit (step 311) an alarm or notify the application upon detection of additional alarm events. It is useful to maintain a log file at each tag for logging of alarm events.

As such, those skilled in the art will appreciate that the conception, upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit ad scope of the present invention.

While the invention has been described with respect to a limited number of embodiments, it will be appreciated that many variations, modifications and other applications of the invention may be made.

What is claimed is:

1. A method comprising:
   intercommunicating with tags in a group of tags via a radio frequency transceiver;
   implementing, by a given tag within the group of tags, an interrogator role that causes the given tag to interrogate the group of tags, wherein interrogating the group of tags includes:
      determining a distance from at least a first tag to at least a second tag via said intercommunicating, wherein said distance is determined by measuring a round trip delay time between transmitting a transmitted signal from the first tag to the second tag and receiving a response signal in response to said transmitted signal from the second tag at the first tag, and
      triggering an alarm when said distance is greater than a previously defined threshold distance; and
   passing, by the given tag, the interrogator role to another tag within the group of tags.

2. The method, according to claim 1, wherein said intercommunicating between the tags is based on ultra-wide band signals.

3. The method, according to claim 1, wherein said determining is performed by measuring a time delay between transmitting a unicast ultra-wide band message and receiving a unicast ultra-wide band response message.

4. The method, according to claim 1, wherein said intercommunicating relays information regarding completeness of the group between the tags of the group.

5. The method, according to claim 1, further comprising:
   providing a configuration mechanism for configuring the group;
   said configuring the group of the tags by performing at least one task selected from the group of tasks consisting of (i) adding a tag to the group, (ii) removing at least one of the tags from the group, (iii) programming said at least one of the tags to intercommunicate with said at least one other tag and (iv) storing in said at least one of the tags a parameter proportional to said previously defined threshold distance; and
   upon completing said configuring, removing said configuration mechanism, whereby said tags maintain security by said intercommunicating.

6. The method, according to claim 1, further comprising:
   synchronizing the tags wherein each of the tags transmits and receives during coinciding, periodic time intervals.

7. The method, according to claim 6, said synchronizing is performed by transmitting beacon signals from at least one of the tags to at least one other of the tags.

8. The method, according to claim 6, further comprising:
   switching at least one of said tags into a sleep mode outside of said previously determined time interval and switching to an active mode during said previously determined time interval, thereby conserving battery power.

9. The method, according to claim 1, wherein said intercommunicating includes selecting either multicast or broadcast transmitted messages, wherein a decision to transmit with a time frame is probabilistic based on an estimate of traffic within the group.

10. The method, according to claim 1, wherein said intercommunicating includes selecting either multicast or broadcast transmitted messages, wherein a decision to transmit within a time frame is deterministic according to a previously defined ordering algorithm.

11. The method, according to claim 1, wherein said intercommunicating includes using unicast ultra-wide band transmitted messages and receiving unicast response messages to relay information regarding completeness of the group, wherein said intercommunicating is performed during a time interval, wherein said time interval is sufficiently long so that a first tag of the group to interrogate receives an interrogation signal from a last of the group to interrogate, and wherein outside said time interval the tags within the group switch into a sleep mode, thereby conserving battery power.

12. The method, according to claim 1, wherein said alarm is selected from a group consisting of a sound, a light, an alarm record stored in at least one of the tags, a transmitted alarm message, and a command disabling a device operatively attached to one of the tags.

13. The method, according to claim 1, wherein said alarm is logged as an alarm record in memory of at least one of the tags, said alarm record is retrieved upon querying by a read in temporary communication with said at least one of the tags.

14. A tag comprising:
   processing circuitry;
   a radio frequency transceiver; and
   an alarm mechanism;
   wherein the processing circuitry is configured to:
      control the radio frequency transceiver to intercommunicate with a group of tags;
      implement an interrogation role that causes the radio frequency transceiver to interrogate the group of tags, wherein being configured to interrogate the group of tags includes being configured to:
         determine a distance to at least a second tag in the group of tags using said intercommunicating, wherein said distance is determined by measuring a round trip delay time between transmitting a transmitted signal to the second tag and receiving a response signal in response to said transmitted signal from the second tag, and
         control the alarm mechanism to selectably trigger an alarm or modify an operation of a device operatively attached to the tag, in response to said distance being greater than a previously defined threshold distance; and pass the interrogator role to another tag within the group of tags.

15. The tag according to claim 14, wherein the tag is included with a system, the system further comprising a configuration mechanism operative to perform a task selected from the group of tasks consisting of:

(i) adding a tag to the group, (ii) removing at least one of the tags from the group, (iii) programming said at least one of the tags to intercommunicate with said at least one other tag, and (iv) storing in said at least one of the tags a parameter proportional to said previously defined threshold distance.

16. The tag according to claim 14, wherein being configured to control the radio frequency transceiver to intercommunicate includes using unicast ultra-wide band transmitted messages and receiving unicast response messages to relay formation regarding completeness of the group, wherein said intercommunicating is performed during a time interval, wherein said time interval is sufficiently long so that a first tag of the group to interrogate receives an interrogation signal from a last of the group to interrogate, and wherein outside said time interval the tags within the group switch into a sleep mode, thereby conserving battery power.

* * * * *